United States Patent
Jiang et al.

(10) Patent No.: US 12,181,911 B2
(45) Date of Patent: Dec. 31, 2024

(54) AUTOMATIC OVERCLOCKING CONTROLLER BASED ON CIRCUIT DELAY MEASUREMENT

(71) Applicant: SHANGHAITECH UNIVERSITY, Shanghai (CN)

(72) Inventors: Weixiong Jiang, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 33 days.

(21) Appl. No.: 18/224,579

(22) Filed: Jul. 21, 2023

(65) Prior Publication Data
US 2024/0231415 A1    Jul. 11, 2024

Related U.S. Application Data

(63) Continuation of application No. PCT/CN2023/083293, filed on Mar. 23, 2023.

(30) Foreign Application Priority Data

Jan. 6, 2023    (CN) .......................... 202310016209.6

(51) Int. Cl.
*G06F 1/26* (2006.01)
*G06F 1/08* (2006.01)
*H04B 17/364* (2015.01)

(52) U.S. Cl.
CPC .................. *G06F 1/08* (2013.01); *G06F 1/26* (2013.01); *H04B 17/364* (2015.01)

(58) Field of Classification Search
CPC ............ G06F 1/08; G06F 1/26; H04B 17/364
See application file for complete search history.

(56) References Cited

U.S. PATENT DOCUMENTS

| | | | |
|---|---|---|---|
| 9,432,009 B2 * | 8/2016 | Whatmough | H03K 5/135 |
| 2009/0160509 A1 * | 6/2009 | Wu | H03L 7/1974 |
| | | | 327/156 |
| 2010/0281278 A1 * | 11/2010 | Hsiao | G06F 1/08 |
| | | | 713/300 |
| 2016/0261257 A1 * | 9/2016 | Huang | H03K 3/0375 |
| 2021/0326232 A1 * | 10/2021 | Partiwala | G06F 11/3058 |
| 2023/0018414 A1 * | 1/2023 | Langhammer | G06F 1/06 |

FOREIGN PATENT DOCUMENTS

CN        113168206 A   *  7/2021   ............. G01R 31/30

* cited by examiner

*Primary Examiner* — Zahid Choudhury
(74) *Attorney, Agent, or Firm* — Bayramoglu Law Offices LLC

(57) ABSTRACT

An automatic overclocking controller based on circuit delay measurement is provided, including a central processing unit (CPU), a clock generator, and a timing delay monitor (TDM) controller. Compared with the prior art, the present disclosure has following innovative points: A two-dimension-multi-frame fusion (2D-MFF) technology is used to process a sampling result, to eliminate sampling noise, and an automatic overclocking controller running on a heterogeneous field programmable gate array (FPGA) can automatically search for a highest frequency at which an accelerator can operate safely.

5 Claims, 2 Drawing Sheets

AUTOMATIC OVERCLOCKING CONTROLLER BASED ON CIRCUIT DELAY MEASUREMENT

CROSS REFERENCE TO THE RELATED APPLICATIONS

This application is a continuation application of International Application No. PCT/CN2023/083293, filed on Mar. 23, 2023, which is based upon and claims priority to Chinese Patent Application No. 202310016209.6, filed on Jan. 6, 2023, the entire contents of which are incorporated herein by reference.

TECHNICAL FIELD

The present disclosure relates to an automatic overclocking controller suitable for a field programmable gate array (FPGA)-based neural network accelerator.

BACKGROUND

In recent years, an FPGA-based neural network accelerator has been widely applied [1], and various performance optimization methods have been proposed in succession [2]. At present, a mainstream static timing analysis tool of an FPGA reserves a certain timing margin to use a worst working condition. Therefore, an overclocking technology can be used to remove an overly conservative time margin to maximize performance. Although the overclocking technology may cause a timing error, a plurality of studies have shown that a neural network can tolerate a small quantity of errors [3], which makes it possible to combine the overclocking technology with a neural network accelerator.

There are currently two main methods for handling a potential timing error, namely an algorithm based fault tolerance (ABFT) method and a method based on timing error warning/delay measurement. The ABFT method verifies an input and an output of an algorithm [4], and if a verification value does not meet certain characteristics, an error may occur. However, the ABFT method can only be applied to a convolution calculation and cannot be applied to other operators in the neural network. Although the method based on timing error warning/delay measurement can be applied to any operator, a timing detector used cannot be applied to all timing paths [5].

REFERENCES

[1] Yun Liang, Liqiang Lu, and Jiaming Xie. OMNI: A framework for integrating hardware and software optimizations for sparse CNNs. IEEE Trans. Comput. Aided Des. Integr. Circuits Syst., 40(8): 1648-1661, 2021.
[2] Duy Thanh Nguyen, Tuan Nghia Nguyen, Hyun Kim, and Hyuk-Jae Lee. A high-throughput and power-efficient FPGA implementation of YOLO CNN for object detection. IEEE Trans. Very Large Scale Integr. Syst., 27(8): 1861-1873, 2019.
[3] Muhammad Abdullah Hanif, Rehan Hafiz, and Muhammad Shafique. Error resilience analysis for systematically employing approximate computing in convolutional neural networks. In Design, Automation & Test in Europe, DATE, pages 913-916. IEEE, 2018.
[4] Thibaut Marty, Tomofumi Yuki, and Steven Derrien. Safe overclocking for CNN accelerators through algorithm-level error detection. IEEE Trans. Comput. Aided Des. Integr. Circuits Syst., 39(12):4777-4790, 2020.
[5] Jose L. Nunez-Yanez. Energy proportional neural network inference with adaptive voltage and frequency scaling. IEEE Trans. Computers, 68(5):676-687, 2019.

SUMMARY

A calculation problem to be resolved by the present disclosure is that an existing ABFT method can only be applied to convolution calculation and cannot be applied to other operators in a neural network, and a timing detector used in a method based on timing error warning/delay measurement cannot be applicable to all timing paths.

In order to resolve the above technical problem, technical solutions of the present disclosure provide an automatic overclocking controller based on circuit delay measurement, including a central processing unit (CPU), a clock generator, and a timing delay monitor (TDM) controller, where
a phase of a shadow clock (SCLK) output by the clock generator is adjusted from 0° to 360°, the TDM controller controls a circuit delay detector to sample the clock generator N times in a same phase before moving to a next phase, until the clock generator is sampled in all phases, and a final sampling value of each phase is an average value of sampling values obtained from N times of sampling in the current phase;
the TDM controller is further configured to perform horizontal multi-frame fusion on final sampling values of all the phases to obtain transition points $\theta_1$ and $\theta_2$;
when the horizontal multi-frame fusion is performed, the final sampling value of each phase is defined as one frame of data; therefore, an $n^{th}$ frame of data obtained after the horizontal multi-frame fusion is an average value of an $$\left(n - \frac{M-1}{2}\right)^{th}$$

frame of data to an $$\left(n + \frac{M-1}{2}\right)^{th}$$

frame of data, where M represents a coefficient of the horizontal multi-frame fusion;
the transition point $\theta_1$ is a point whose sampling value changes from 0 to 1 after the horizontal multi-frame fusion, and the transition point $\theta_2$ is a point whose sampling value changes from 1 to 0 after the horizontal multi-frame fusion; and
the CPU is configured to obtain the transition points $\theta_1$ and $\theta_2$ from the TDM controller to calculate a circuit delay $t_d$, and determine a frequency $f_{next}$ of an accelerator for a next operating cycle based on the circuit delay $t_d$.

Preferably, if the average value of the sampling values obtained from the N times of sampling in the current phase is not greater than 0.5, a final sampling value of the current phase is 0, otherwise a final sampling value of the current phase is 1.

Preferably, the TDM controller includes a sampler and a transition point finder, where the sampler controls the circuit delay detector to obtain the final sampling values of all the phases and perform the horizontal multi-frame fusion, and the transition point finder searches for the transition points $\theta_1$ and $\theta_2$.

Preferably, the sampler shares a plurality of circuit delay detectors, and the CPU calculates the circuit delay $t_d$ for a plurality of paths by using the plurality of circuit delay detectors, and selects a longest circuit delay $t_d$ from a plurality of circuit delays $t_d$ to determine the frequency $f_{next}$ of the accelerator for the next operating cycle.

Preferably, the CPU calculates the circuit delay $t_d$ according to a following formula:

$$t_d = \frac{\theta}{360} \cdot T$$

where $$\theta = \frac{\theta_1 + \theta_2 + 180°}{2},$$

and T represents a clock cycle.

Compared with the prior art, the present disclosure has following innovative points:
1) A two-dimensional-multi-frame fusion (2D-MFF) technology is used to process a sampling result, to eliminate sampling noise.
2) An automatic overclocking controller running on a heterogeneous FPGA can automatically search for a highest frequency at which an accelerator can operate safely.

DETAILED DESCRIPTION OF THE EMBODIMENTS

The present disclosure will be further described below with reference to specific embodiments. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent forms also fall within the scope defined by the appended claims of the present disclosure.

Figure 1:
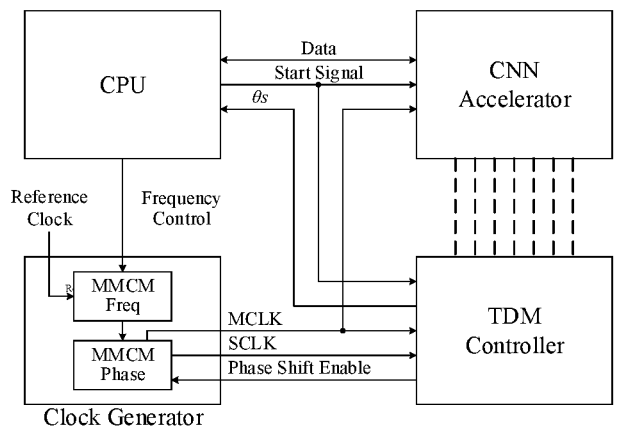
FIG. 1 schematically shows an automatic overclocking controller according to an embodiment.
Figure 2:
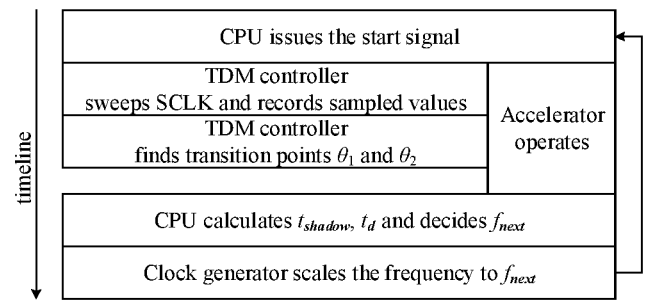
FIG. 2 schematically shows a working process of an automatic overclocking controller.

In order to efficiently implement an automatic overclocking controller, an embodiment proposes a control scheme based on a hybrid FPGA, which includes a CPU, a clock generator, and a TDM controller, as shown in FIG. 1. A working process of the control scheme shown in FIG. 2.

Figure 3:
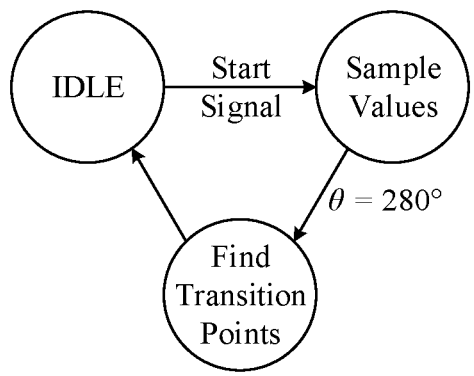
FIG. 3 is a state transition diagram of an automatic overclocking controller.
Figure 4:
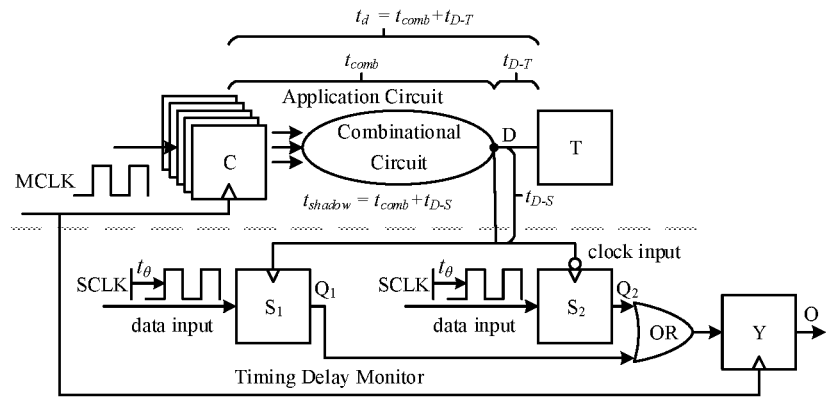
FIG. 4 schematically shows a circuit delay detector used according to an embodiment.

The TDM controller consists of a sampler and a transition point finder, and has three states: idle (IDLE), sampling (SampleValues), and post-processing (Find Transition Points), as shown in FIG. 3. To reduce area, a plurality of circuit delay detectors may share one sampler. The circuit delay detector used in this embodiment is shown in FIG. 4, and its working principle is described in detail in [1], which is only briefly repeated herein. The circuit delay detector consists of an SCLK, two shadow registers $S_1$ and $S_2$, synchronization register Y, and an OR gate. Combinational logic output serves as clock signals of the $S_1$ and the $S_2$. The $S_1$ captures a rising edge, and the $S_2$ captures a falling edge. The SCLK connects to data ports of the $S_1$ and the $S_2$. The SCLK maintains a same frequency as a main clock, but has one phase $\theta$ lagged behind compared with the main clock. Outputs $Q_1$ and $Q_2$ of the shadow registers pass through the OR gate and are sampled by the synchronous register Y. Meanings of reference numerals in FIG. 4 are as follows:

D: represents an output port of the combinational logic.

$t_{comb}$: represents time during which a time point at which an output signal generated by the output port D of the combinational logic lags behind a time point at which the rising edge of the clock signal reaches clock port C. In the FPGA, a delay of the combinational logic includes both a propagation delay of a LUT and a line delay between LUTs, but they can be considered as a whole.

$t_{D-T}$: represents a line delay from the output port D of the combinational logic to an input port of path endpoint T.

$t_{D-S}$: represents a line delay from the output port D of the combinational logic to clock ports of the shadow registers $S_1$ and $S_2$.

$t_d$: represents time during which a time point at which an edge of the output signal generated by the combinational logic reaches the endpoint T lags behind the time point at which the rising edge of the clock signal reaches the clock port C, where $t_d = t_{comb} + t_{D-T}$.

$t_{shadow}$: represents time during which a time point at which the edge of the output signal generated by the combinational logic reaches the clock ports of the shadow registers $S_1$ and $S_2$ lags behind the time point at which the rising edge of the clock signal reaches the clock port C, where $t_{shadow} = t_{comb} + t_{D-S}$.

$t_\theta$: represents time during which that the SCLK has the same frequency as the main clock MCLK, but the rising edge of the SCLK lags behind that of the main clock MCLK, where $$t_\theta = \frac{\theta}{360} \cdot T,$$

and T represents a clock cycle.

$t_{shadow}$ represents a delay detected by the circuit delay detector, and $t_d$ represents a desired delay, which can be approximately considered equal.

Figure 5:
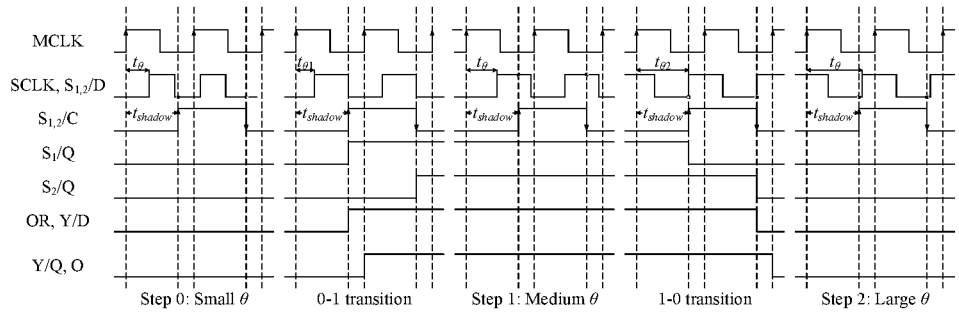
FIG. 5 is a schematic timing diagram of a circuit delay detector.

As shown in FIG. 5, when $t_\theta$ is small, a sampling value of the circuit delay detector is 0. As $t_\theta$ increases to $t_{\theta 1}$, the sampling value becomes 1. As $t_\theta$ continues to increase to $t_{\theta 2}$, the sampling value becomes 0 again. $t_{\theta 2}$ is the measured delay $t_d$. A duty cycle of the clock signal is usually 50%, and $\theta_1$ and $\theta_2$ may differ by 180°. Therefore, $$\theta = \frac{\theta_1 + \theta_2 + 180°}{2},$$

and $$t_d = \frac{\theta}{360} \cdot T.$$

Figure 6:
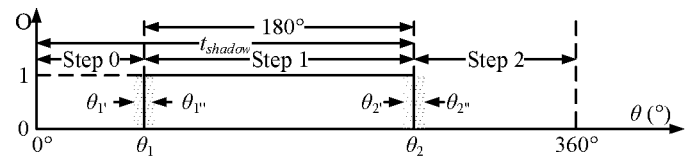
FIG. 6 schematically shows a change of a sampling value of a circuit TDM with $t_\theta$.

However, in a process of changing the sampling value from 1 to 0, there will be a stage in which the sampling value is unstable, which is referred to as a sampling jitter and involves a stage from $\theta_{1'}$ to $\theta_{1''}$ and a stage from $\theta_{2'}$ to $\theta_{2''}$, which are shadowed in FIG. 6. In order to handle the stage with the unstable sampling value, the present disclosure proposes a 2D-MFF technology. 2D-MFF consists of two steps, namely vertical multi-frame fusion and horizontal multi-frame fusion.

Figure 7:
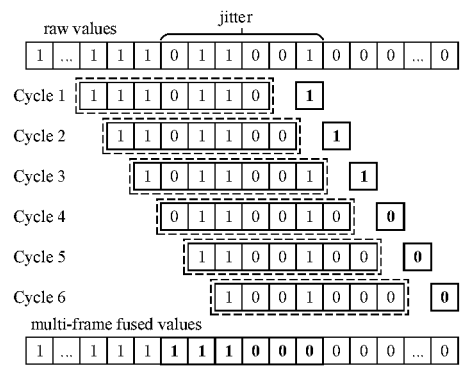
FIG. 7 is a schematic diagram of horizontal multi-frame fusion.

The vertical fusion is completed in a sampling process. The sampler controls the circuit delay detector to perform a plurality of times of sampling in a same phase, and an average value of the plurality of times of sampling is taken as a sampling value of a current frame corresponding to the phase. For example, if five times of sampling are performed at 100°, sampling values are all 10010, and an average value is 0.4, 0 is taken as a sampling value of 100°. The horizontal multi-frame fusion is completed after the sampling, and needs to be performed for each phase. A quantity of frames to be fused is defined by a developer as required. In this embodiment, if a coefficient of the horizontal multi-frame fusion is 7, an obtained sampling value of an $n^{th}$ frame after the horizontal multi-frame fusion is an average value of sampling values of an $(n-3)^{th}$ frame, $(n-2)^{th}$ frame, $(n-1)^{th}$ frame, the original $n^{th}$ frame, an $(n+3)^{th}$ frame, an $(n+2)^{th}$ frame, and an $(n+1)^{th}$ frame. Before the horizontal multi-frame fusion, both ends of a sampled sequence need to be filled to cover a boundary situation. Assuming that a complete phase is 360° and the coefficient of the horizontal multi-frame fusion is 7, it is necessary to fill data values of 357°, 358°, and 359° to −3°, −2°, and −1°. A data value of a phase of 0° is determined by an average value of data values of 7 phase points at −3° to 3°. By analogy, a final value of each phase point is determined by an average value of sampling values of neighboring phases of the phase point. In hardware implementation, first in first out (FIFO) can be used to achieve the horizontal multi-frame fusion. As shown in FIG. 7, in cycle 1, the FIFO is filled with 1110110, and 1 is taken as an average value; in cycle 2, the FIFO outputs one 1, one 0 is input, and 1 still taken as an average value; and so on. After the horizontal multi-frame fusion, there is an unstable stage of 011001 in the process of changing the original sampling value from 1 to 0. After the 2D-MFF, this unstable stage becomes 111000, and the jitter disappears.

Firstly, the CPU sends a startup signal, and an accelerator and the TDM controller are started simultaneously. The sampler performs a plurality of times of sampling in a same phase and then moves to a next phase, until all phases are sampled. Then, the transition point finder performs the horizontal multi-frame fusion on each path to find transition points $\theta_1$ and $\theta_2$. It should be noted that this operation needs to be completed before the accelerator ends running. When the accelerator ends running, the CPU obtains the transition points of each path from the TDM controller to calculate circuit delay $t_d$, and determines frequency $f_{next}$ of the accelerator for a next operating cycle based on longest delay $t_d$.

A frequency modulation strategy is determined by the developer. A simplest frequency modulation strategy is as follows: If $t_d$ is less than a current clock cycle, an operating frequency increases by 1 MHz, and vice versa, the operating frequency decrease by 1 MHz.

The above technical solutions can be applied to an FPGA-based neural network accelerator.

What is claimed is:

1. An automatic overclocking controller based on a circuit delay measurement, comprising a central processing unit (CPU), a clock generator, and a timing delay monitor (TDM) controller, wherein
   a phase of a shadow clock (SCLK) output by the clock generator is adjusted from 0° to 360°, the TDM controller controls a circuit delay detector to sample the clock generator N times in a same phase before moving to a next phase, until the clock generator is sampled in all phases, and a final sampling value of each phase of the all phases is an average value of sampling values obtained from N times of sampling in a current phase;
   the TDM controller is further configured to perform a horizontal multi-frame fusion on final sampling values of the all phases to obtain transition points $\theta_1$ and $\theta_2$;
   when the horizontal multi-frame fusion is performed, the final sampling value of each phase is defined as one frame of data; therefore, an $n^{th}$ frame of data obtained after the horizontal multi-frame fusion is an average value of an $$\left(n - \frac{M-1}{2}\right)^{th}$$

frame of data to an $$\left(n + \frac{M-1}{2}\right)^{th}$$

frame of data, wherein M represents a coefficient of the horizontal multi-frame fusion;
   the transition point $\theta_1$ is a point wherein a sampling value changes from 0 to 1 after the horizontal multi-frame fusion, and the transition point $\theta_2$ is a point wherein a sampling value changes from 1 to 0 after the horizontal multi-frame fusion; and
   the CPU is configured to obtain the transition points $\theta_1$ and $\theta_2$ from the TDM controller to calculate a circuit delay $t_d$, and determine a frequency $f_{next}$ of an accelerator for a next operating cycle based on the circuit delay $t_d$.

2. The automatic overclocking controller based on the circuit delay measurement according to claim 1, wherein if the average value of the sampling values obtained from the N times of sampling in the current phase is not greater than 0.5, a final sampling value of the current phase is 0, and if the average value of the sampling values obtained from the N times of sampling in the current phase is greater than 0.5, a final sampling value of the current phase is 1.

3. The automatic overclocking controller based on the circuit delay measurement according to claim 1, wherein the TDM controller comprises a sampler and a transition point finder, wherein the sampler controls the circuit delay detector to obtain the final sampling values of the all phases and perform the horizontal multi-frame fusion, and the transition point finder searches for the transition points $\theta_1$ and $\theta_2$.

4. The automatic overclocking controller based on the circuit delay measurement according to claim 3, wherein the sampler shares a plurality of circuit delay detectors, and the CPU calculates a plurality of circuit delays $t_d$ for a plurality of paths by using the plurality of circuit delay detectors, and selects a longest circuit delay $t_d$ from the plurality of circuit delays $t_d$ to determine the frequency $f_{next}$ of the accelerator for the next operating cycle.

5. The automatic overclocking controller based on the circuit delay measurement according to claim 1, wherein the CPU calculates the circuit delay $t_d$ according to a following formula:

$$t_d = \frac{\theta}{360} \cdot T$$

wherein $$\theta = \frac{\theta_1 + \theta_2 + 180°}{2},$$

and T represents a clock cycle.

* * * * *